FORMULA I

FORMULA II

○ BORON

◉ CARBON

○ HYDROGEN ON CARBON
(HYDROGEN ATOMS ON
BORON OMITTED FOR
CLARITY)

United States Patent Office 3,377,370
Patented Apr. 9, 1968

3,377,370
BIS-DIORGANOSILYLAMINE CARBORANES
Stelvio Papetti, Hamden, Conn., assignor to Olin Mathieson Chemical Corporation, a corporation of Virginia
Filed June 24, 1964, Ser. No. 377,648
4 Claims. (Cl. 260—448.2)

ABSTRACT OF THE DISCLOSURE

Organoboron compounds containing both silicon and nitrogen are prepared by reacting a compound of the formula:

$$X_{(3-n)}R''_nSiCB_{10}H_8RR'CSiR''_nX_{(3-n)}$$

Figure 1:
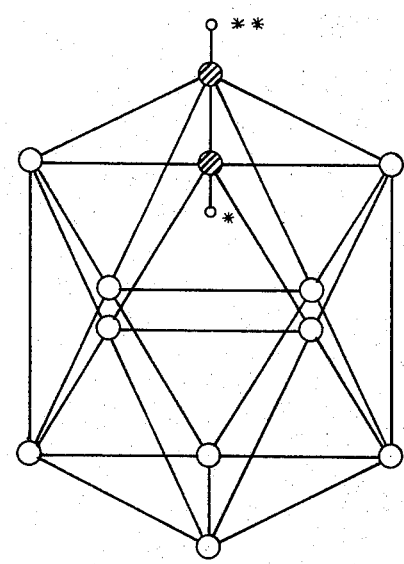
Figure 1:
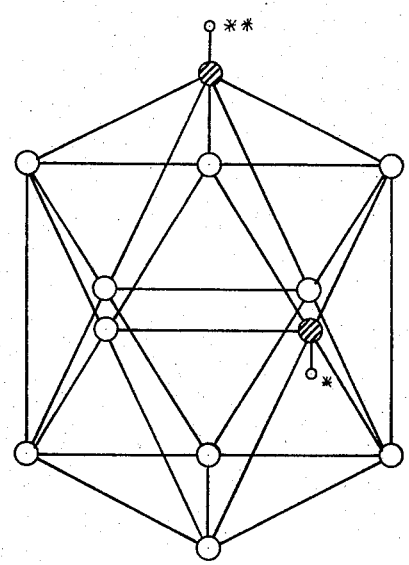

wherein R and R' are hydrogen or alkyl, R'' is alkyl or aryl, X is a halogen selected from the group consisting of chlorine, bromine and iodine, and $n$ is an integer of from 0 to 2 inclusive, with a compound of the formula:

$$HNR'''R''''$$

wherein R''' and R'''' are hydrogen or alkyl.

---

This invention relates to organoboron compounds containing both silicon and nitrogen and to a method for their preparation.

The novel compounds of this invention have the formula:

$$(R''''R'''N)_{(3-n)}R''_nSiCB_{10}H_8RR'CSiR''_n(NR'''R'''')_{(3-n)}$$

wherein R, R', R''' and R'''' are each selected from the group consisting of hydrogen or an alkyl radical having from 1 to 5 carbon atoms, R'' is alkyl of from 1 to 5 carbon atoms or aryl of not more than 8 carbon atoms, R''' is hydrogen or alkyl of from 1 to 6 carbon atoms and $n$ is an integer of from 0 to 2 inclusive.

It has been found that the novel organoboron compounds of this invention can be prepared by reacting a compound of the formula:

$$X_{(3-n)}R''_nSiCB_{10}H_8RR'CSiR''_nX_{(3-n)}$$

wherein R and R' are each selected from the group consisting of hydrogen and an alkyl radical containing from 1 to 5 carbon atoms, R'' is alkyl of from 1 to 6 carbon atoms or aryl of not more than 8 carbon atoms, X is a halogen selected from the group consisting of chlorine, bromine and iodine, and $n$ is an integer of from 0 to 2 inclusive, with a nitrogen-containing compound of the formula:

$$HNR'''R''''$$

wherein R''' and R'''' are each selected from the group consisting of hydrogen or alkyl of from 1 to 6 carbon atoms. The novel process of this invention is preferably conducted in the presence of an inert organic solvent such as aliphatic hydrocarbons, for example, pentane, hexane, heptane, etc.; aromatic hydrocarbons, for example, benzene, toluene, xylene, etc., and ethers, such as the lower dialkyl ethers.

The radical —CB$_{10}$H$_8$RR'C— is derived from the meta isomer of carborane (i.e., neocarborane) of the formula:

$$HCB_{10}H_8RR'CH$$

When organoboranes (i.e., carboranes) of the class:

$$RR'B_{10}H_8C(H)C(H)$$

wherein R and R' are each selected from the group consisting of hydrogen and an alkyl radical containing from 1 to 5 carbon atoms are heated to a temperature of above 400° C. a thermal isomerization takes place and the so-called neocarboranes are formed. For example, the compound carborane (B$_{10}$H$_{10}$C(H)C(H)) can be converted to neocarborane by heating in a sealed tube at a temperature of about 475° C. for 5 to 20 hours. The structural formula of the compound carborane is shown as structural Formula I in FIGURE 1 while the structural formula of the compound neocarborane is shown as structural Formula II in FIGURE 1.

The reaction proceeds as shown in the following equation:

$$X_{(3-n)}R''_nSiCB_{10}H_{10}RR'CSiR''_nX_{(3-n)} + 4(3-n)HNR'''R'''' \rightarrow (R''''R'''N)_{(3-n)}R''_nSiCB_{10}H_8RR'CSiR''_n(NR'''R'''')_{(3-n)} + 2(3-n)HNR'''R''''\cdot HX$$

wherein R, R', R''', X and $n$ have the same meaning as previously described.

The reaction proceeds satisfactorily at room temperature although temperatures as low as −10° C. to about +80° C. can be employed. Preferably, the reaction temperature is maintained between about −10° C. and about +50° C. Generally, the reaction time will be from about 0.05 hour to about 5 hours or more and preferably will be from about 0.10 hour to about 3 hours depending upon the particular reaction conditions employed. Pressure ranging from subatmospheric to about +10 atmospheres or more can be utilized although the reaction is generally carried out at atmospheric pressure. In preparing the products of this invention usually an excess of the nitrogen-containing reactant is employed, although satisfactory yields are achieved when stoichiometric quantities of the two reactants are utilized.

When the nitrogen-containing compound employed is a gas at room temperature (e.g., ammonia or monomethylamine), it is simply passed into a solution of the silicon-containing organoboron starting material dissolved in the lower dialkyl ether. If a liquid nitrogen-containing compound is employed, for example, monopropylamine, it is added directly to the silicon-containing organoboron dissolved in the liquid dialkyl ether or other suitable inert solvent or it can be added as a solution of the nitrogen-containing compound in an inert organic solvent. The hydrohalide salt formed during the reaction is insoluble in the reaction mixture and can be removed by centrifugation, filtration, or by any other convenient method. Evaporation of the reaction mixture to dryness after the hydrohalide salt has been removed yields the crude product which can be purified by distillation in the case of liquid products or by recrystallization in the case of solid products from a wide variety of solvents such as benzene, xylene, toluene, chloroform, petroleum ether, pentane, hexane, heptane, etc.

Suitable inert organic solvents for use in the process of this invention include the lower dialkyl ethers, such as diethyl ether, di-n-propyl ether, methyl ethyl ether, di-isopropyl ether, di-n-butyl ether, di-isoamyl ether, etc. Other useful solvents include aromatic hydrocarbons such as benzene, toluene, xylene, etc. as well as petroleum hydrocarbons, such as pentane, hexane, heptane, etc.

The bis(halodialkylsilyl) neocarboranes and bis(dihaloalkylsilyl) neocarboranes suitable as starting materials for the process of this invention can be prepared by the process set forth in Papetti application Ser. No. 310,379, filed Sept. 20, 1963, for Compound and Process. The compound bis(chlorodimethylsilyl) neocarborane, for example, can be prepared by reacting neocarborane (HCB$_{10}$H$_{10}$CH) successively with butyl lithium and dichloro dimethylsilane in a solution of diethyl ether at ice-bath temperature. Other useful bis(haloalkylsilyl) neocarboranes include bis(chlorodiethylsilyl) neocarborane, bis(chloro-di-n-butylsilyl) neocarborane, bis(chlorodiisoamylsilyl) neocarborane, bis(methylethylchlorosilyl) neocarborane, bis(methyldichlorosilyl) neocarborane, bis(dichloro-n-butylsilyl) neocarborane, bis(chlorodiphenylsilyl) neocarborane, bis(phenyldichlorosilyl) neocarborane, bis(chlorodixylylsilyl) neocarborane, bis(chloroditolylsilyl) neocarborane, bis(methylphenylchlorosilyl) neocarborane, and the corresponding bromine and iodine derivatives. The compound bis(trichlorosilyl) neocarborane and the corresponding bromine and iodine derivatives are also useful starting materials for this process.

Nitrogen-containing compounds useful as starting materials in this invention include ammonia, monomethylamine, dimethylamine, monoethylamine, diethylamine, monoisopropylamine, diisopropylamine, mono-n-propylamine, di-n-propylamine, monoisoamylamine, diisoamylamine, etc.

The following examples illustrate specific embodiments of this invention and are to be considered not limitative.

In the examples the term "moles" signifies "gram moles."

EXAMPLE I

Bis-(chlorodimethylsilyl)-neocarborane (11.3 g., 0.045 mole) was dissolved in 200 ml. of ether and cooled in an ice bath. Gaseous ammonia was passed through the reaction mixture for 45 minutes during which time a precipitate formed. The mixture was filtered, the filtrate evaporated to dryness and the residue, thus obtained, was sublimed under reduced pressure. Bis-(aminodimethylsilyl) neocarborane (Compound A) having the formula:

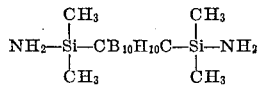

was recovered in 77 percent yield, M.P. 41.5°–43.5° C.

Compound A was analyzed for carbon, hydrogen, boron, silicon and nitrogen and the following results were obtained:

Calculated for $C_6H_{26}B_{10}N_2Si_2$: C, 24.80; H, 9.01; B, 37.22; Si, 19.33; N, 9.64. Found: C, 24.69; H, 9.05; B, 36.86; Si, 19.42; N, 9.60.

Compound A has the same structural formula as structural Formula II in FIGURE 1 with the exception the hydrogen atoms indicated by the single and double asterisks are replaced by the radical:

EXAMPLE II

Bis(chlorodimethylsilyl) neocarborane (2.0 g.) was dissolved in 50 ml. of ethyl ether. Gaseous monomethylamine was passed into the solution at room temperature for 35 minutes, during which time a precipitate was formed. The mixture was filtered and the filtrate was evaporated to dryness. The residue formed was then distilled under reduced pressure. Bis(methylaminodimethylsilyl) neocarborane (Compound B) having the formula:

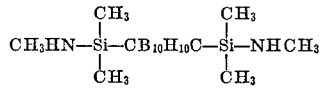

was obtained in 75 percent yield (B.P. 107–108° C., 0.03 mm. Hg).

Compound B was analyzed for carbon, hydrogen, boron and nitrogen and the following results were obtained:

Calculated for $C_8H_{30}B_{10}N_2Si_2$: C, 30.11; H, 9.5; B, 33.95; N, 8.79. Found: C, 29.56; H, 9.80; B, 34.05; N, 8.67.

Compound B has the same structural formula as structural Formula II in FIGURE 1 with the exception that the hydrogen atoms indicated by the single and double asterisks are each replaced by the radical:

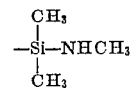

EXAMPLE III

Bis(chlorodimethylsilyl) neocarborane (35.4 g.) was dissolved in 200 ml. of ethyl ether. Gaseous dimethyl amine was passed into the solution at room temperature for 30 minutes, during which time a precipitate formed. The mixture was filtered, the filtrate was evaporated to dryness and the residue remaining was then distilled under reduced pressure. Bis(dimethylaminodimethylsilyl) neocarborane (Compound C) having the formula:

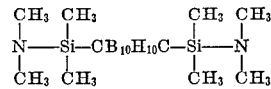

was obtained in 66 percent yield (M.P. 64°–65° C.).

Compound C was analyzed for carbon, hydrogen, boron and nitrogen and the following results were obtained:

Calculated for $C_{10}H_{34}B_{10}N_2Si$: C, 34.63; H, 9.88; B, 31.17; N, 8.08; Si, 16.20. Found: C, 34.60; H, 9.94; B, 31.28; N, 7.77; Si, 16.50.

The structural formula of Compound C is the same as structural Formula II in FIGURE 2 with the exception that the single and double asterisks are each replaced by the radical:

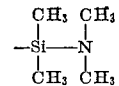

The solid organoboranes produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided organoborane material can be admixed with a high solids content solution of partially condensed urea-formaldehyde or phenol-formaldehyde resin, the proportions being such that the amount of resin is about 5 to 100 percent by weight based upon the weight of oxidizer and the boron compound. The ingredients can be thoroughly mixed with simultaneous removal of solvent, and following this the solvent-free mixture can be molded into the desired shape as by extrusion. Thereafter, the resin can be cured by resorting to heating at moderate temperatures. For further information concerning the formulation of solid propellant compositions, reference is made to U.S. Patent 2,622,277, to Bonnell and to U.S. Patent 2,646,596, to Thomas.

The products of this invention can be homopolymerized to yield high temperature resistant polymers which when compounded with asbestos, silica fiber, etc., and cured can be utilized as gaskets, bushings, and in other applications where high temperature stability is required.

What is claimed is:

1. An organoboron compound of the formula:

$(R''''R'''N)_{(3-n)}R''_n SiCB_{10}H_8RR'CSiR''_n(NR'''R'''')_{(3-n)}$ wherein R, R', R''' and R'''' are each selected from the group consisting of hydrogen and alkyl of from 1 to 5 carbon atoms, R'' is selected from the group consisting of alkyl from 1 to 5 carbon atoms and aryl of not more than 8 carbon atoms, R''' is selected from the group consisting of hydrogen and alkyl of from 1 to 6 carbon atoms, and $n$ is an integer of from 0 to 2.

2.

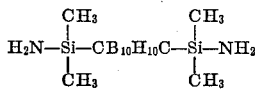

3.

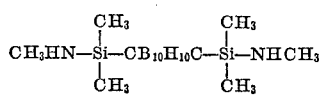

4.

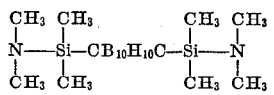

References Cited

Eaborn, "Organosilicon Compounds," Academic Press Inc., New York (1960), pp. 339–341.

TOBIAS E. LEVOW, *Primary Examiner.*

P. F. SHAVER, *Assistant Examiner.*